United States Patent [19]
Lee et al.

[11] Patent Number: 5,969,782
[45] Date of Patent: Oct. 19, 1999

[54] ACTIVE MATRIX LIQUID CRYSTAL DISPLAY HAVING INTERDIGITATED PIXEL AND FIRST COUNTER ELECTRODES IN THE SAME PLANE AND A SECOND COUNTER CONNECTED TO THE FIRST COUNTER ELECTRODE VIA A CONTACT HOLE IN A INSULATING LAYER

[75] Inventors: Seung Hee Lee, Ich'on; Seok Lyul Lee, Anyang; Hyang Yul Kim, Ich'on, all of Rep. of Korea

[73] Assignee: Hyundai Electronics Industries Co., Ltd., Kyoungki-Do, Rep. of Korea

[21] Appl. No.: 09/103,484

[22] Filed: Jun. 24, 1998

[30] Foreign Application Priority Data

Jun. 25, 1997 [KR]  Rep. of Korea ..................... 97-27411

[51] Int. Cl.⁶ ............................................... G02F 1/1343
[52] U.S. Cl. ........................................ 349/141; 349/143
[58] Field of Search ..................................... 349/141, 143

[56] References Cited

U.S. PATENT DOCUMENTS

| | | | |
|---|---|---|---|
| 3,674,342 | 7/1972 | Castellano et al. | 350/160 |
| 3,883,227 | 5/1975 | Kobayashi et al. | 350/160 |
| 3,981,559 | 9/1976 | Channin | 350/160 |
| 4,054,362 | 10/1977 | Baues | 350/96 |
| 5,233,449 | 8/1993 | Shioji et al. | 359/68 |
| 5,448,385 | 9/1995 | Deffontaines et al. | 359/59 |
| 5,598,285 | 1/1997 | Kondo et al. | 349/39 |
| 5,831,707 | 11/1998 | Ota et al. | 349/141 |

OTHER PUBLICATIONS

Display Characteristics of IPS LCDs and a Wide–Viewing–Angle 14.5 in IPS TFT–LCD, Matsumoto et al, Oct. 1996.

*Primary Examiner*—William L. Sikes
*Assistant Examiner*—Heidi L. Eisenhut
*Attorney, Agent, or Firm*—Townsend and Townsend and Crew, LLP

[57] ABSTRACT

A liquid crystal display. The display has a substrate and a first counter electrode formed on the substrate. The first counter electrode extends in a first direction. An insulating layer having a contact opening is formed on the substrate, which has the first counter electrode. A pixel electrode is formed on the insulating layer and has a body separated from the first counter electrode by a selected distance. The pixel electrode also has a plurality of comb-teeth, which extends parallel to the first counter electrode from the body of the pixel electrode. The body extends in a second direction substantially perpendicular to the first direction. A second counter electrode is formed on the insulating layer. The second electrode also has a body extending parallel to the body of the pixel electrode. The pixel electrode has a plurality of comb-teeth extending from the body of the second counter electrode in the first direction. The body of the second counter electrode overlaps the first counter electrode at one end thereof. The plurality of comb-teeth of the second counter electrode interdigitate with the plurality of the pixel electrode by a predetermined distance.

15 Claims, 5 Drawing Sheets

ACTIVE MATRIX LIQUID CRYSTAL DISPLAY HAVING INTERDIGITATED PIXEL AND FIRST COUNTER ELECTRODES IN THE SAME PLANE AND A SECOND COUNTER CONNECTED TO THE FIRST COUNTER ELECTRODE VIA A CONTACT HOLE IN A INSULATING LAYER

BACKGROUND OF THE INVENTION

The present invention is related to liquid crystal displays ("LCDs"). More particularly, the invention provides an LCD having a counter electrode that has a first part and a second part and a pixel electrode.

A liquid crystal display ("LCD") has elements such as a pair of transparent insulating substrates, a thin film transistor ("TFT"), and a pixel electrode. The thin film transistor and pixel electrode are formed on one of the transparent insulating substrates. A color filter and a counter electrode are formed on the other insulating substrate. A liquid crystal material is placed between the pair of substrates. In operation, an electric field is formed between the pixel electrode and the counter electrode by way of an applied voltage. Liquid crystal molecules rearrange along the electric field between the electrodes.

An in-plane switching ("IPS") mode thin film transistor had been used or suggested for improving limitations such as a low viewing angle and a low contrast ratio. The IPS mode TFT has a pixel electrode and a counter electrode which are formed on a lower substrate. Between the pixel electrode and the counter electrode is formed an electric field, so along the electric field the liquid crystal molecules are rearranged.

A variety of limitations exist with conventional LCD designs such as the one described above as well as others. In particular, the conventional LCD design generally has inefficient designs that tend to reduce transmittance of the LCD. Additionally, conventional LCD designs do not form the pixel electrode and the counter electrode on the same plane. Accordingly, LCD response times are often reduced. Furthermore, conventional LCD's often use opaque metal materials, which generally require more power to achieve a desired luminance. The conventional LCD may also output images that are distorted and the like by way of conventional design layouts.

From the above, it is seen that an improved liquid crystal display is desired.

SUMMARY OF THE INVENTION

According to the present invention, a technique including a device for an improved liquid crystal display is provided. In an exemplary embodiment, the present invention provides an improved liquid crystal display device.

In a specific embodiment, the present invention provides an improved LCD structure. The LCD structure includes, among other elements, a first counter electrode near or adjacent to a data line. A pixel electrode is formed during a same or similar step as a capacitor structure. An insulating layer is formed between the pixel electrode and the capacitor. A second counter electrode, which substantially forms an electric field which induces an arrangement of liquid crystal molecules, is disposed from the data line. A portion of the counter electrode (e.g., first and second electrodes), which is parallel to the scanning line, is not overlapped with the pixel electrode. Instead, the first counter electrode is made of a suitable opaque material, and is contacted with the second counter electrode made of transparent material through a contact opening or hole. The pixel electrode and the second counter electrode are "comb-shaped" (or have a plurality of "fingers") having a plurality of teeth parallel to the scanning line. The comb-teeth of the pixel electrode extends into the space between the comb-teeth of the counter electrode. In other embodiments, the pixel electrode and the second counter electrode are made of transparent material.

In an alternative specific LCD according to the present invention, LCD has a substrate, which has a first counter electrode formed thereon. The first counter electrode extends in a first direction. An insulating layer having a contact hole or opening is provided on the substrate, which has the first counter electrode. On the insulating layer is disposed a pixel electrode having a body separated from the first counter electrode by a selected distance and extending in a second direction substantially perpendicular to the first direction. The pixel electrode further has a plurality of comb-teeth (or fingers) extending from the body, and parallel to the first counter electrode. On the insulating layer, a second counter electrode is disposed. The second counter electrode has a body overlapping the first counter electrode at one side and extends parallel to the body of the pixel electrode. The pixel electrode also has a plurality of comb-teeth extending from the body of the second counter electrode in the first direction. The comb-teeth of the second counter electrode is interdigitated with the comb-teeth of the pixel electrode in a geometrically symmetrical manner in some embodiments. The second counter electrode is connected through a contact hole or opening to the first counter electrode. The second counter electrode extends from the first counter electrode in the second direction so as to be overlapped with the body of the pixel electrode, with interposing the insulating layer therebetween. The scanning line extends in the first direction and is separated from one of the outer comb-teeth of the second counter electrode. Here, the pixel electrode and the second counter electrode are made of transparent metal, specifically Indium Tin Oxide (ITO) or the like, but is not limited to the ITO. The first counter electrode is made of opaque metal such as MoW, Mo/Al or Al Nd but is not limited. The width of the comb-teeth in the pixel electrode or the second counter electrode is less than about 8 $\mu$m and preferably about 6 $\mu$m. The distance between the comb-teeth in the pixel electrode and the comb-teeth of the second counter electrode is less than about 10 $\mu$m and preferably about 5 $\mu$m.

Numerous benefits or advantages are achieved by way of the present invention over conventional techniques. In some embodiments, the present invention provides a resulting LCD that has increased transmittance. In other embodiments, the present invention has faster response times or speed by way of the novel designs and methods. In yet other embodiments, the present invention provides an increased aperture ratio and the like. Still further, distortion is reduced in some embodiments. The present invention uses one or more of these benefits in one or more of the embodiments. These benefits and others will be described in greater detail below.

The present invention achieves these benefits in the context of known process technology. However, a further understanding of the nature and advantages of the present invention may be realized by reference to the latter portions of the specification and attached drawings.

BRIEF DESCRIPTION OF THE ATTACHED DRAWINGS

DETAILED DESCRIPTION OF THE INVENTION

Conventional Displays

Figure 1:
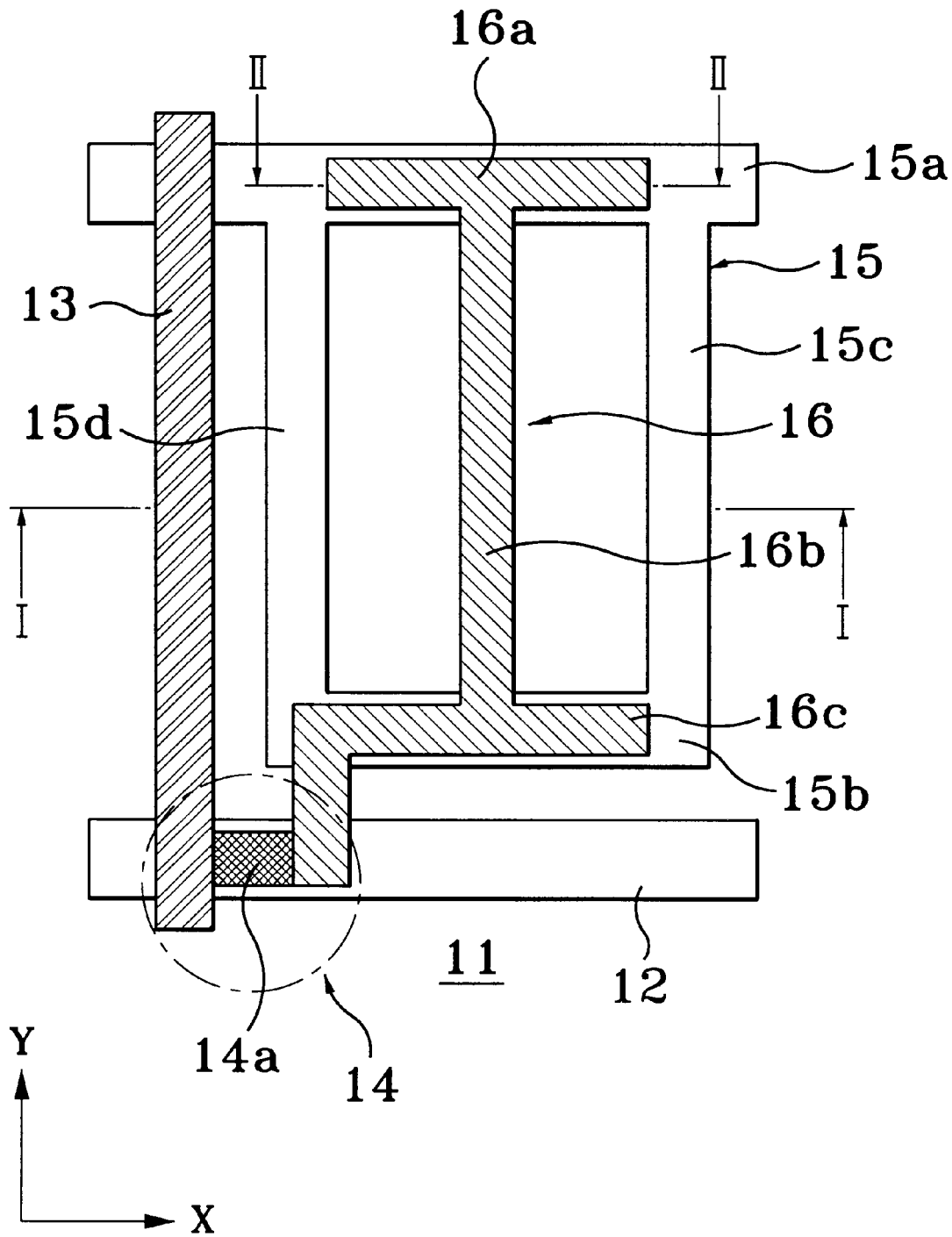
FIG. 1 shows a conventional in-plane switching ("IPS") mode liquid crystal display("LCD") device.

A unit cell of the IPS mode LCD device is illustrated in FIG. 1. A scanning line 12 is on the lower substrate 11 arranged in X-direction. A data line 13 is arranged in the Y-direction and vertically intersects the scanning line 12. Between the scanning line 12 and the data line 13 is an insulating layer 17 (See FIGS. 2A and 2B). At a cross-point of the scanning line 12 and the data line 13 is a thin film transistor T, which includes a channel layer 14a. A counter electrode 15 has a rectangularly shaped frame and is located at a space defined by the scanning line 12 and the data line 13. The counter electrode 15 has a first part 15a and a second part 15b, which are each parallel to the scanning line 12 and overlaps the data line 13. The counter electrode also has a third part 15c and a fourth part 15d, which are each parallel to the data line 13. The pixel electrode 16 includes a first part 16a and a second part 16c, which are each parallel to the scanning line 12, and overlaps the first part and the second part of the counter electrode. The pixel electrode also has a third part 16b bisecting the space by connecting the middle part of the first part 16a and second part 16c of the pixel electrode 16. The source electrode of the TFT 14 is one body together with the second part 16c of the pixel electrode 16. The pixel electrode is generally made of an opaque metal.

Figure 2A:
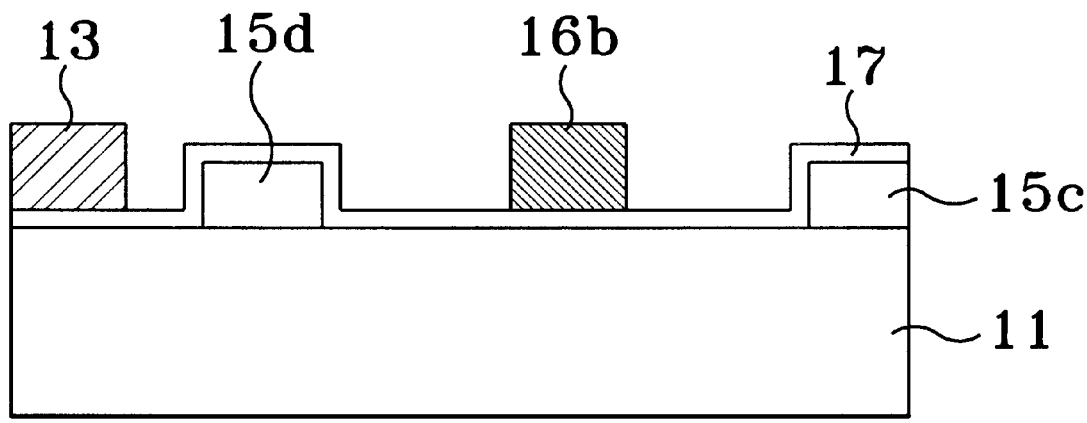
FIGS. 2A and 2B are simplified sectional-view diagrams along I—I and II—II of the device in FIG. 1.

FIG. 2A is a sectional view along I—I in the device of FIG. 1. The third part 15c and the fourth part 15d of the counter electrode are positioned on the lower substrate 11. Insulating layer 17 is formed on the substrate 11 having the counter electrode. The third part 16b of the pixel electrode 16 is at a middle or center region between the third part 15c and the fourth part 15d of the counter electrode. The data line 13 is positioned near the left side of the fourth part 15d of the counter electrode. Insulating layer 17 is also interposed between the pixel electrode and the counter electrode, which creates a "step" from the pixel electrode to the counter electrode.

Figure 2B:
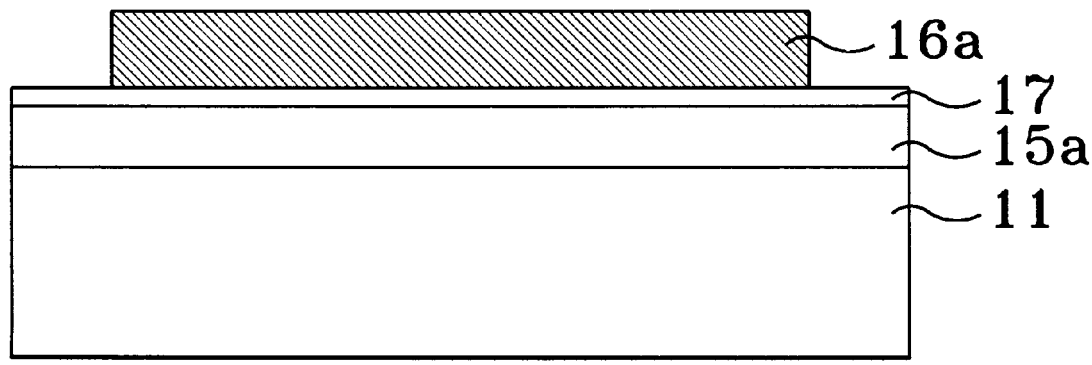

FIG. 2B is a cross-sectional view along II—II in the device of FIG. 1. The first part 15a of the counter electrode is formed on the lower substrate 11. Insulating layer 17 and the first part 16a of the pixel electrode are sequentially formed on the first part 15a of the counter electrode.

In operation, an electric field is produced between the counter electrode 15 and the pixel electrode 16, which is parallel to the lower substrate 11, by way of an applied voltage between such electrodes. Liquid crystal molecules rearrange along the electric field. Since the IPS mode LCD device uses the electric field which is parallel to the substrate, viewing angle is often improved.

It has been found that the conventional IPS mode LCD device in FIG. 1, however, has one or more of the following limitations, as well as others. As shown in the FIG. 2B, the conventional device has a region where insulating layer 17 is formed between the pixel electrode 15a, 15b and the counter electrode 16a, 16c. Rearrangement of the liquid crystal molecules in this region is limited. Accordingly, overall transmittance of the LCD is reduced.

Additionally, the pixel electrode and the counter electrode are generally not formed on the same plane. The insulating layer is also formed between these electrodes. Thus, electric field density parallel to the lower substrate 11 is often weaker than LCDs having a pixel electrode formed on the same plane as the counter electrode. Furthermore, the fringe field is also larger toward the upper substrate. Accordingly, response time or speed of the LCD is lower in the conventional LCD.

The conventional LCD also uses a pixel electrode that is made of an opaque metal. The conventional LCD also has a low aperture ratio. To compensate for the opaque metal and low aperture ratio, a strong back light is often required in order to achieve a desired luminance. Accordingly, power is often increased which increases power consumption.

The conventional LCD has a data line 13 that is positioned near the counter electrode 15d, as shown in the FIGS. 1 and 2A. In operation of the LCD device, the electric field between the pixel electrode and the counter electrode can be reflected by a signal passing through the data line 13. Accordingly, liquid crystal molecules between the pixel electrode and the counter electrode can become distorted, which often degrades viewing angle and the like. These limitations, at least in part, can be solved by way of the present LCD device. Details of the present device are shown below.

Present LCD Embodiments

Figure 3A:
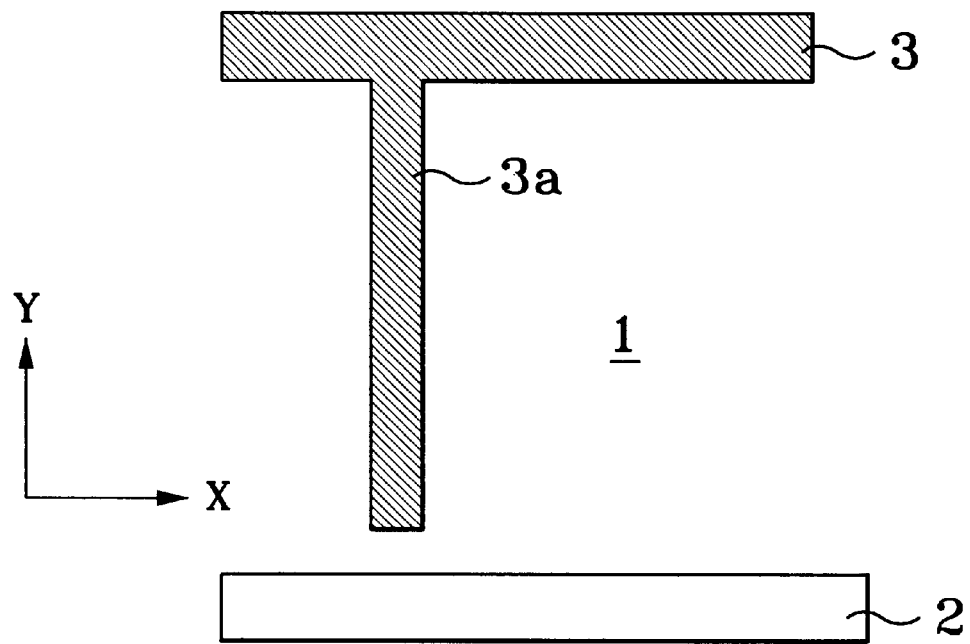
FIGS. 3A to 3C are simplified plane views of an IPS mode LCD device according to an embodiment of the present invention.
Figure 3B:
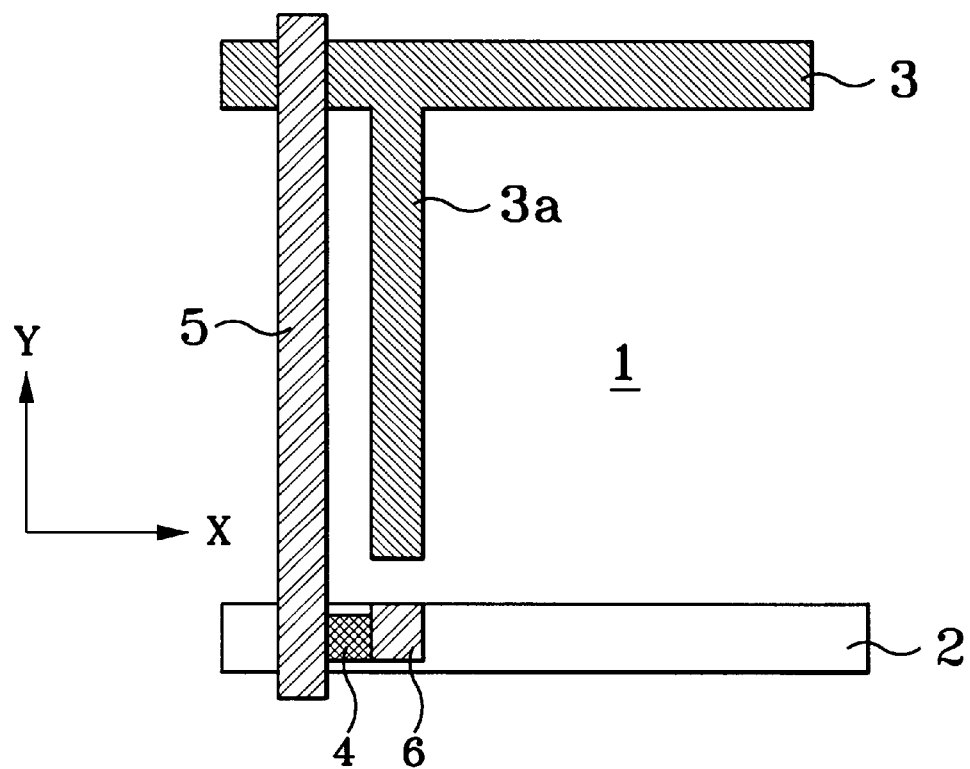
Figure 3C:
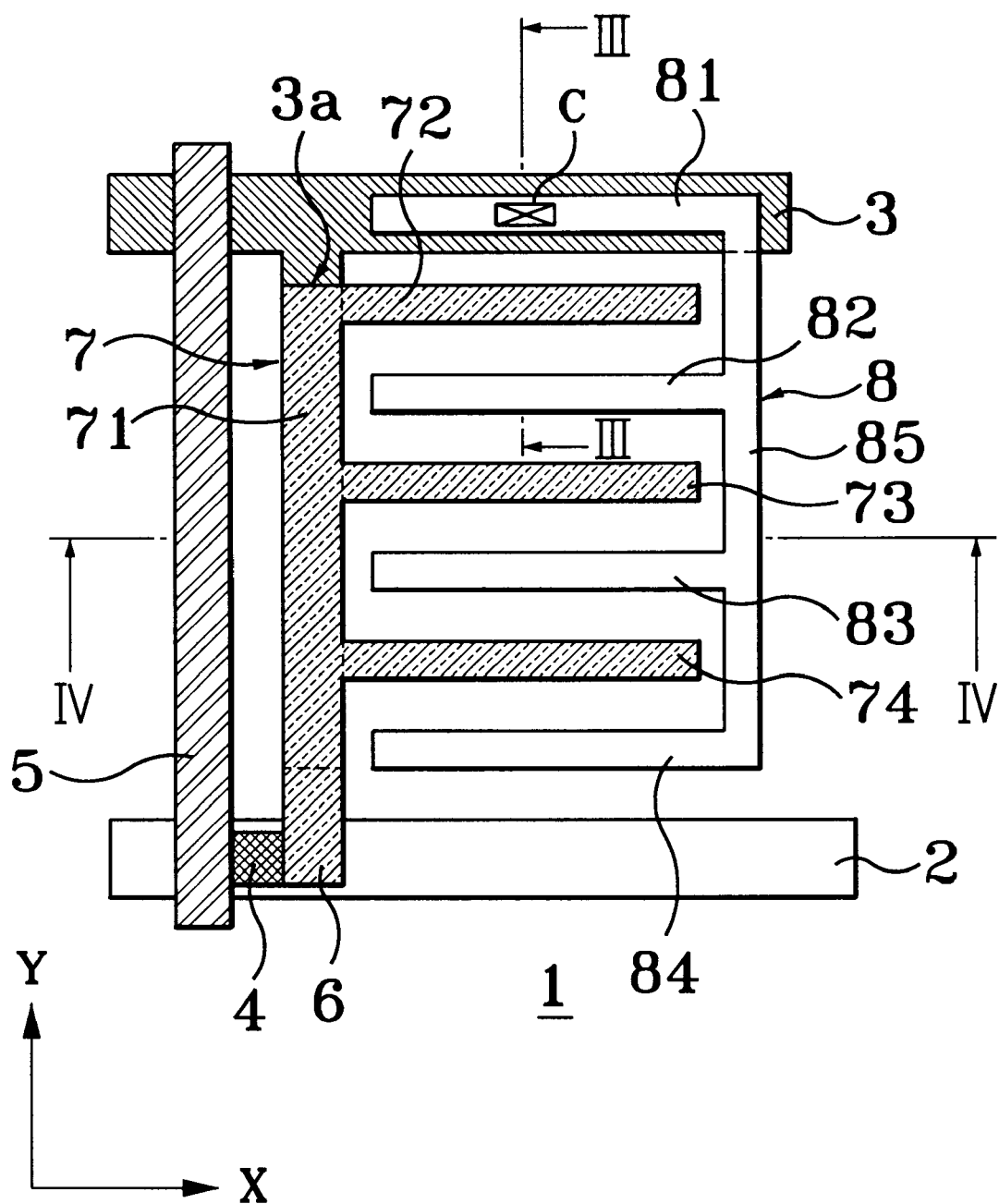

Referring to FIG. 3C, an improved IPS mode LCD device according to an embodiment of the present invention is described. This device is merely an illustration and should not limit the scope of the claims herein. One of ordinary skill in the art would recognize other variations, modifications, and alternatives. A scanning line 2 is disposed in an X-direction on a substrate 1. A data line 5 extends in a Y-direction and overlaps the scanning line 2, since the data line is formed over the scanning line. A first counter electrode 3 is often made of a suitable material such as an opaque material. The first counter electrode also extends parallel to the scanning line 2. A storage electrode 3a is connected to the first counter electrode 3 and disposed near and parallel to the data line 5. In case of using a panel having 18.1", a vertical dimension of an unit pixel is 280.5 $\mu$m and a horizontal dimension thereof is 210.5 $\mu$m with l/d>1 where l is a distance between a pixel electrode and a counter electrode and d is a cell gap. The storage electrode is about more 2 $\mu$m from the data line. A second counter electrode 8 is made of a suitable transparent material. The second electrode is substantially parallel to the scanning line 2.

The pixel electrode 7 overlaps the storage electrode 3a, as shown in FIG. 3C. The pixel electrode 7 is also "comb-shaped," which includes a first part 71 extending parallel to the data line 5. The pixel electrode also has a second part, which includes comb-teeth 72, 73, 74 or fingers. These teeth or fingers extend away from and are normal to the first part 71. One end of the first part 71 of the pixel electrode 7 is separated from the first counter electrode 3 by a selected distance. In an embodiment using the 18.1" panel, the selected distance is about 5 $\mu$m. The selected distance is made considering a driving voltage The other end of the first part 71 is contacted with a drain electrode 6 of the transistor device. Each of comb-teeth 72, 73 and 74 or fingers is connected to one end of the first part 71 of the pixel electrode 7. Comb-tooth 74 is separated from the scanning line 2 by a selected distance. In an embodiment using the 18.1" panel, the selected distance is about 16 $\mu$m more or less. Comb-tooth 73 is disposed between the outer comb-teeth 72, 74. Using the 18.1" panel and the number of the comb-teeth of the pixel being 11, the spacing is about 16 $\mu$m. The pixel electrode is often made of a suitable transparent metal, for example ITO, or the like. As shown, the first part 71 of the pixel electrode will be called as "a body" and the second part 72, 73, 74 will be called as "comb-teeth," which are commonly also known as "fingers."

A second counter electrode 8 is inter-digitated with the pixel electrode 7 comb teeth or fingers. The second counter electrode 8 is also comb-shaped, which is similar to the pixel electrode 7. The second counter electrode 8 has a first part 85 (body) extending parallel to the data line 5 toward the scanning line 2 from over the first counter electrode 3. The second counter electrode 8 further has a second part (comb-teeth), which is defined as a plurality of comb-teeth 81, 82, 83, 84. The comb teeth extend substantially parallel to the scanning line 2. The comb-teeth of the second counter electrode extends from the body thereof toward the body 71 of the pixel electrode. Accordingly, the comb-teeth of the second counter electrode are inter-digitated with the comb-teeth of the pixel electrode. One 81 of the outer comb-teeth of the second counter electrode 8 is formed over the first counter electrode 3, and the other 84 of the outer comb-teeth of the second counter electrode 8 is disposed between the scanning line 2 and the outer comb-tooth 74. The first counter electrode and the comb-tooth 81 of the second counter electrode 8 are connected through a contact opening or hole C.

In a specific embodiment, the manufacturing process of the IPS mode LCD mentioned above will be described below. This process is merely an illustration and should not limit the scope of the claims herein. One of ordinary skill in the art would recognize other variations, modifications, and alternatives.

Referring to FIG. 3A, for example, scanning line 2 and first counter electrode 3 are formed on lower substrate 1. The first counter electrode 3 is substantially parallel to the scanning line 2, and is separated from the scanning line 2 by a selected distance which is defined as a unit cell area. In an embodiment using the 18.1" panel, the selected distance is about 280.5 μm. The storage electrode 3a protrudes from the first counter electrode 3 toward the scanning line 2. The storage electrode is also substantially normal to the scanning line, but is not limited. The first counter electrode 3 is made of a suitable transparent or opaque metal. The first counter electrode is made of the opaque metal to increase a response speed of the LCD. As merely an example, the opaque metal is MoW, Mo/Al or AlNd and the like.

Referring to FIG. 3B, channel region 4 is formed overlying a portion of scanning line 2. A drain electrode 6 is formed at one end of the channel layer 4. The scanning line 5 vertically intersects with the first counter electrode and extends parallel to the storage electrode 3a. The scanning line also passes over the other end of the channel layer 4. The source electrode is formed at the end of the data line 5 overlapped with the other end of the channel layer. That is, at the cross-section of the scanning line 2 and data line 5, TFT with channel layer 4 is formed. The drain electrode 6 and the source electrode are also formed at the cross-section.

To prevent any possible shorting between the scanning line 2, the data line 5 and the drain electrode 6, the insulating layer 20 is interposed between the scanning line 2 and the channel layer 4, as well as interposed between the scanning line 5 and the drain electrode 6. The scanning line 2 is made of opaque metal such as MoW alloy or Mo/Al and the data line 5, and the drain electrode 6 are made of a suitable opaque metal such as Mo/Al/Mo, but can be others.

Referring to FIG. 3C, the second counter electrode 8 and the pixel electrode 7 are disposed on the resultant structure in FIG. 3B. The pixel electrode 7 overlaps the storage electrode 3a and is a comb-shaped structure. The pixel electrode has body 71 extending parallel to the data line 5. Pixel electrode also has a plurality of comb-teeth 72, 73 and 74 that extend parallel to the scanning line from the body 71. One end of the body 71 of the pixel electrode 7 is separated from the first counter electrode 3 by a selected distance, which is about 5 μm for a 18.1" panel, for example. The other end thereof is contacted with the drain electrode 6. Comb-tooth 72 is connected to one end of the body 71 of the pixel electrode. Comb-tooth 74 is separated from the scanning line 2 by a selected distance, which is about 16 μm for the 18.1 panel. The comb-tooth 73 is disposed between the outer two comb-teeth 72 and 74. The pixel electrode is made of a suitable transparent metal, for example ITO, but is not limited to such a metal.

The second counter electrode 8 is interdigitated with the pixel electrode 7. Pixel electrode is also comb-shaped similar to the pixel electrode 7. The second counter electrode 8 has a body 85 extending from the first counter electrode 3 toward the scanning line 2, and is parallel to the data line 5 and includes a plurality of comb-teeth 81, 82, 83 and 84. The comb teeth 81, 82, 83 and 84 extend parallel to the scanning line 2 from the body 85 thereof toward the body 71 of the pixel electrode. The comb-teeth 81, 82, 83 and 84 are inter-digitated with the comb-teeth 72, 73 and 74 of the pixel electrode 7, for example. One 81 of the outer two comb-teeth 81, 84 is formed over the first counter electrode 3 and the other 84 of the outer comb-teeth 81, 84 is formed between the scanning line 2 and the outer comb-tooth 74 of the pixel electrode 7. The first counter electrode 3 and the comb-tooth 81 of the second counter electrode 8 are connected through the contact hole or opening C. The second counter electrode is made of a suitable transparent metal, such as ITO, but is not limited.

The width of the comb-teeth 72, 73 and 74 of the pixel electrode 7 or the comb-teeth 81, 82, 83 and 84 of the second counter electrode 8 is preferably less than about 8 μm and preferably about 6 μm. The distance between the comb-teeth in the pixel electrode 7 and the comb-teeth in the second counter electrode 8 is preferably less than about 10 μm and preferably about 5 μm. Of course, the particular dimensions depend upon the application.

Figure 4A:
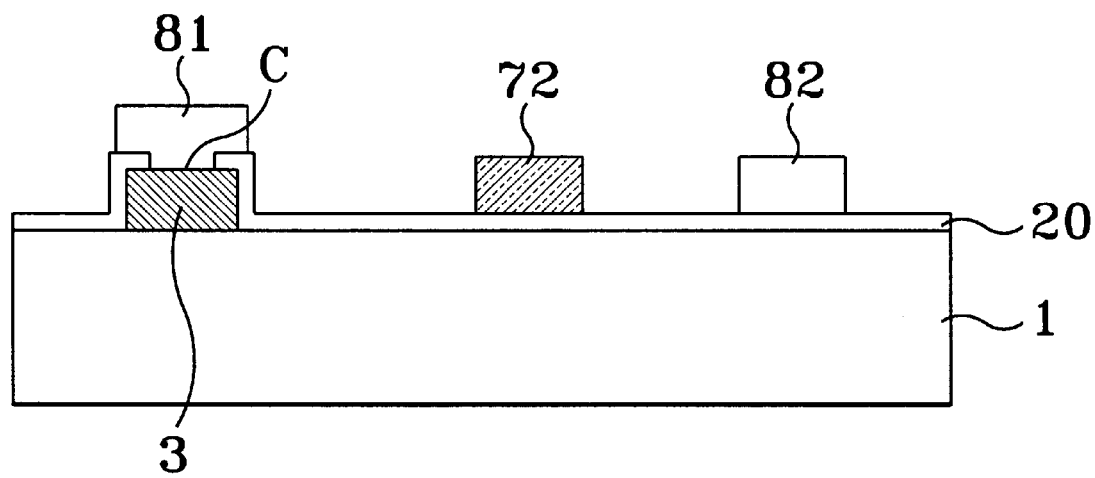
FIGS. 4A and 4B are simplified sectional views along III—III and IV—IV of the device in FIG. 3C.

FIG. 4A is a simplified cross-sectional view diagram along III—III of the device in FIG. 3C. The first counter electrode 3 is contacted to the comb-tooth 81 of the second counter electrode 8 through the contact hole or opening C. Both the comb-tooth 72 of the pixel electrode 7 and the comb-tooth 82 of the second counter electrode 8 are arranged and separated by a selected distance over the insulating layer 20.

Figure 4B:
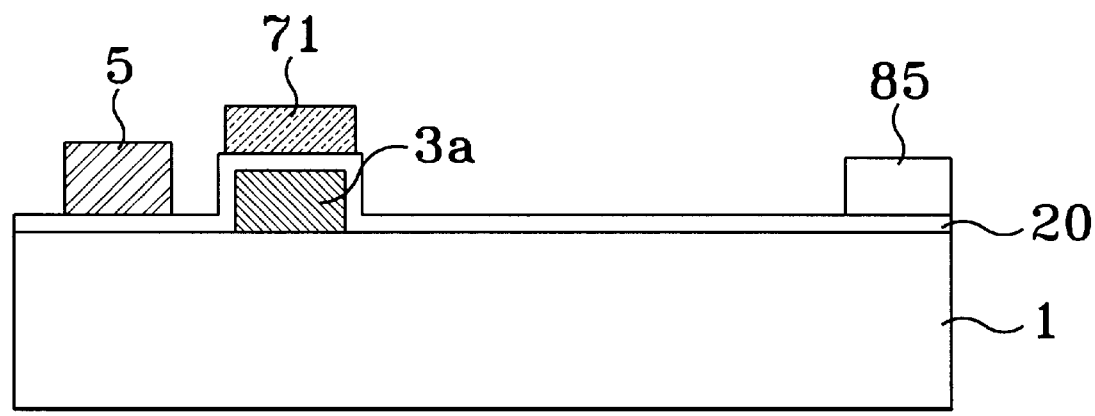

FIG. 4B is a simplified cross-sectional view along IV—IV of the device in FIG. 3C. The storage electrode 3a near the data line 5 and the body 71 of the pixel electrode are generally stacked. A capacitor with insulating layer 20 formed therebetween is also shown in the storage electrode.

In a specific embodiment, application of an external voltage to the LCD generates an electric field between the pixel electrode and the second counter electrode. Liquid crystal molecules are rearranged in responsive to the electric field. The following characteristics can be derived from the above mentioned LCD. Since the pixel electrode 7 and the second counter electrode 8 are made of transparent metal, the transmittance and the aperture ratio of the LCD generally increases. Additionally, at a portion parallel to the scanning line 2, there is substantially no insulating layer between the pixel electrode and the counter electrode. Rather than the insulating layer, the first counter electrode and the second counter electrode are connected to each other through the contact hole or opening. Accordingly, there is substantially no sensitivity limitations experienced by the liquid crystal molecules of conventional devices.

Furthermore, the storage electrode 3a near the data line 5 forms a capacitor together with the insulating layer 20 and the pixel electrode 71, which maintains the voltage applied to the LCD in a selected time. Since the fingers 81, 82, 83 and 84 of the second counter electrode 8 and the fingers 72, 73 and 74 of the pixel electrode 7 forming the electric field by which the liquid crystal molecules are rearranged, are perpendicularly arranged to the data line 5, an interference of the liquid crystal molecules in the parallel electric field between the pixel electrode and the second counter electrode, caused by the data line, can be sufficiently prevented.

Moreover, the pixel electrode and the second counter electrode, which form the electric field making the liquid crystal molecules rearrange, are formed on the insulating layer 20. That is, the pixel electrode and the second counter electrode are formed on the same or similar plane. Accordingly, the parallel electric field does not weaken by the insulating layer and the response speed of the LCD increases.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A liquid crystal display comprising:
   a substrate;
   a first counter electrode formed on said substrate and extending in a first direction;
   an insulating layer having a contact opening and formed on the substrate having said first counter electrode;
   a pixel electrode formed on said insulating layer and having a body separated from said first counter electrode by a selected distance and having a plurality of comb-teeth extending parallel to said first counter electrode from said body of said pixel electrode, said body extending in a second direction substantially perpendicular to the first direction; and
   a second counter electrode formed on said insulating layer and having a body extending parallel to said body of said pixel electrode and a plurality of comb-teeth extending from said body of said second counter electrode in said first direction, said body of said second counter electrode overlapping said first counter electrode at one end thereof and said plurality of comb-teeth of said second counter electrode interdigitated with said plurality of comb-teeth of said pixel electrode by a predetermined distance within a unit cell area.

2. The liquid crystal display as claimed in claim 1, further comprising a storage electrode extending from said first counter electrode in the second direction so as to be overlapped with said body of said pixel electrode, with interposing said insulating layer.

3. The liquid crystal display as claimed in claim 1, further comprising a data line near said body of said pixel electrode and extending in the second direction.

4. The liquid crystal display as claimed in claim 1, wherein said pixel electrode arid said second counter electrode are made of transparent metal.

5. The liquid crystal display as claimed in claim 1, wherein said first counter electrode is made of opaque metal.

6. The liquid crystal display as claimed in claim 1, further comprising a scanning line extending in the first direction and separately disposed from one of outer two comb-teeth of said second counter electrode.

7. The liquid crystal display as claimed in claim 4, wherein said transparent metal is indium tin oxide.

8. The liquid crystal display as claimed in claim 1, wherein a width of said comb-teeth of said pixel electrode or said second counter electrode is less than about 8 $\mu$m.

9. The liquid crystal display as claimed in claim 1, wherein said predetermined distance is less than about 10 $\mu$m.

10. A liquid crystal display comprising:
    a substrate;
    a scanning line formed on said substrate and extending in a first direction;
    a first counter electrode extending in the first direction and separated from said scanning line by a selected distance to define a unit cell area;
    a storage electrode extending from said first counter electrode toward said scanning line in a second direction substantially perpendicular to the first direction;
    an insulating layer having a contact hole and formed on the substrate having said first counter electrode and said scanning line;
    a data line formed on said insulating layer, intersecting said scanning line and extending in the second direction;
    a pixel electrode formed on said insulating layer and having a body extending in the second direction, overlapping said storage electrode and a plurality of comb-teeth extending from said body of said pixel electrode in the first direction; and
    a second counter electrode formed on said insulating layer and having a body extending parallel to said body of said pixel electrode and a plurality of comb-teeth extending from said body of said second counter electrode in said first direction, said body of said second counter electrode overlapping said first counter electrode at one end thereof and said plurality of comb-teeth of said second counter electrode interdigitated with said plurality of comb-teeth of said pixel electrode by a predetermined distance, said second counter electrode connected to said first counter electrode through said contact hole.

11. The liquid crystal display as claimed in claim 10, wherein said pixel electrode and said second counter electrode are made of transparent metal.

12. The liquid crystal display as claimed in claim 11, wherein said transparent metal is indium tin oxide.

13. The liquid crystal display as claimed in claim 10, wherein said first counter electrode is made of opaque metal.

14. The liquid crystal display as claimed in claim 10, wherein a width of said comb-teeth of said pixel electrode and said second counter electrode is less than about 8 $\mu$m.

15. The liquid crystal display as claimed in claim 10, wherein a predetermined distance is less than about 8 $\mu$m.

* * * * *